United States Patent
Ibushi et al.

(10) Patent No.: US 12,546,890 B2
(45) Date of Patent: Feb. 10, 2026

(54) PERIPHERY MONITORING APPARATUS AND PROGRAM THEREOF

(71) Applicants: DENSO CORPORATION, Kariya (JP); TOYOTA JIDOSHA KABUSHIKI KAISHA, Toyota (JP); J-QuAD DYNAMICS Inc., Tokyo (JP)

(72) Inventors: Masafumi Ibushi, Tokyo (JP); Yasuyuki Miyake, Tokyo (JP); Naotsugu Shimizu, Tokyo (JP); Seiya Fujitsu, Tokyo (JP); Koji Takeuchi, Toyota (JP); Junya Fukuta, Toyota (JP); Takaya Yamashita, Toyota (JP)

(73) Assignees: DENSO CORPORATION, Kariya (JP); TOYOTA JIDOSHA KABUSHIKI KAISHA, Toyota (JP); J-QuAD DYNAMICS Inc., Tokyo (JP)

( * ) Notice: Subject to any disclaimer, the term of this patent is extended or adjusted under 35 U.S.C. 154(b) by 11 days.

(21) Appl. No.: 18/795,797

(22) Filed: Aug. 6, 2024

(65) Prior Publication Data
US 2024/0393458 A1 Nov. 28, 2024

Related U.S. Application Data

(63) Continuation of application No. PCT/JP2023/000604, filed on Jan. 12, 2023.

(30) Foreign Application Priority Data

Feb. 8, 2022 (JP) .................. 2022-018285

(51) Int. Cl.
*G01S 13/931* (2020.01)
*G01S 13/04* (2006.01)
(Continued)

(52) U.S. Cl.
CPC ............ *G01S 13/931* (2013.01); *G01S 13/04* (2013.01); *G01S 13/867* (2013.01); *G01S 2013/9322* (2020.01); *G08G 1/16* (2013.01)

(58) Field of Classification Search
None
See application file for complete search history.

(56) References Cited

U.S. PATENT DOCUMENTS 6,026,353 A * 2/2000 Winner .................... G05D 3/12
702/183
2011/0291874 A1* 12/2011 De Mersseman ....... G01S 13/87
342/70

(Continued)

FOREIGN PATENT DOCUMENTS

JP 2019046392 A 3/2019

*Primary Examiner* — Fekadeselassie Girma
(74) *Attorney, Agent, or Firm* — Maschoff Brennan (57) ABSTRACT

A periphery monitoring apparatus is applied for a vehicle provided with a ranging sensor that transmits probe waves and receives reflection waves of the probe waves, setting a precaution region in a laterally rear side of an own vehicle and causing a collision avoidance operation to be executed when the ranging sensor detects an object in the precaution region. The periphery monitoring apparatus is provided with an acquiring unit that acquires lane information indicating presence or absence of a lane marking on a traffic lane; a recognition unit that recognizes a position of the lane marking based on the lane information; and a precaution region setting unit that sets the precaution region based on the position of the lane marking recognized by the recognition unit.

10 Claims, 8 Drawing Sheets

(51) Int. Cl.
*G01S 13/86* (2006.01)
*G08G 1/16* (2006.01)

(56) References Cited

U.S. PATENT DOCUMENTS

| | | | |
|---|---|---|---|
| 2013/0057688 A1* | 3/2013 | Furukawa | G08G 1/166 |
| | | | 348/148 |
| 2016/0137199 A1* | 5/2016 | Kühne | B60W 50/14 |
| | | | 701/41 |
| 2017/0345312 A1* | 11/2017 | Shimizu | B60R 21/00 |
| 2018/0257646 A1* | 9/2018 | Takeuchi | B60W 50/0097 |
| 2018/0259636 A1* | 9/2018 | Aoyagi | G08G 1/166 |
| 2019/0071081 A1* | 3/2019 | Katayama | B60W 30/18163 |
| 2019/0077404 A1* | 3/2019 | Takeda | B60W 30/0956 |
| 2019/0079181 A1* | 3/2019 | Mizuno | B60W 30/162 |
| 2019/0212440 A1* | 7/2019 | Mukai | G01S 13/86 |
| 2020/0231159 A1* | 7/2020 | Tsuji | G08G 1/167 |
| 2020/0231170 A1* | 7/2020 | Grelaud | B60W 30/18163 |
| 2020/0238982 A1* | 7/2020 | Kang | G08G 1/167 |
| 2021/0343148 A1* | 11/2021 | Lee | G06V 20/588 |
| 2022/0017100 A1* | 1/2022 | Roh | G01S 13/86 |
| 2022/0189293 A1* | 6/2022 | Kang | G08G 1/166 |

* cited by examiner

PERIPHERY MONITORING APPARATUS AND PROGRAM THEREOF

CROSS-REFERENCE OF RELATED APPLICATIONS

This application is the U.S. bypass application of International Application No. PCT/JP2023/000604 filed on Jan. 12, 2023, which designated the U.S. and claims priority to Japanese Patent Application No. 2022-018285 filed on Feb. 8, 2022, the contents of both of these are incorporated herein by reference.

BACKGROUND

Technical Field

The present disclosure relates to a periphery monitoring apparatus and a program thereof.

Description of the Related Art

A periphery monitoring apparatus is known. According to one periphery monitoring apparatus, when a ranging sensor such as a radar device detects other vehicles in a warning area set in a laterally rear side of the own vehicle, a collision avoidance operation is performed such that the driver is notified of the presence of other vehicles.

SUMMARY

A first periphery monitoring apparatus is applied for a vehicle provided with a ranging sensor that transmits probe waves and receives reflection waves of the probe waves, setting a precaution region in a laterally rear side of an own vehicle and causing a collision avoidance operation to be executed when the ranging sensor detects an object in the precaution region. The first periphery monitoring apparatus includes: an acquiring unit that acquires lane information indicating presence or absence of a lane marking on a traffic lane; a recognition unit that recognizes a position of the lane marking based on the lane information; and a precaution region setting unit that sets the precaution region based on the position of the lane marking recognized by the recognition unit.

BRIEF DESCRIPTION OF THE DRAWINGS

The above-described objects and other objects, features and advantages of the present disclosure will be clarified further by the following detailed description with reference to the accompanying drawings. The drawings are.

DETAILED DESCRIPTION OF THE PREFERRED EMBODIMENTS

A periphery monitoring apparatus is known. According to one periphery monitoring apparatus, when a ranging sensor such as a radar device detects other vehicles in a warning area set in a laterally rear side of the own vehicle, a collision avoidance operation is performed such that the driver is notified of the presence of other vehicles. For example, JP-A-2016-85567 discloses a technique for setting a warning region in accordance with a travelling locus to be a predetermined-distance region with respect to a vehicle width direction.

However, with an existing technique, since the warning region is set as a fixed region with respect to the own vehicle, in the case where horizontal width of each traffic lane of the road is narrower, or the own vehicle travels in a direction approaching the adjacent traffic lane, the warning region may be overlapped with a further-adjacent lane relative to the adjacent lane of the own lane. In this case, there is a concern that an unnecessary collision avoidance operation may be activated due to a vehicle travelling in the further-adjacent lane. Moreover, when the own vehicle travels on the own lane being shifted away from the adjacent lane, a part of the adjacent lane may be set to be in an out of the warning region, which may cause inactivation of the collision avoidance operation to a vehicle travelling in an adjacent lane.

First Embodiment

Hereinafter, with reference to the drawings, a first embodiment in which a periphery monitoring apparatus according to the present disclosure is embodies will be described.

Figure 1:
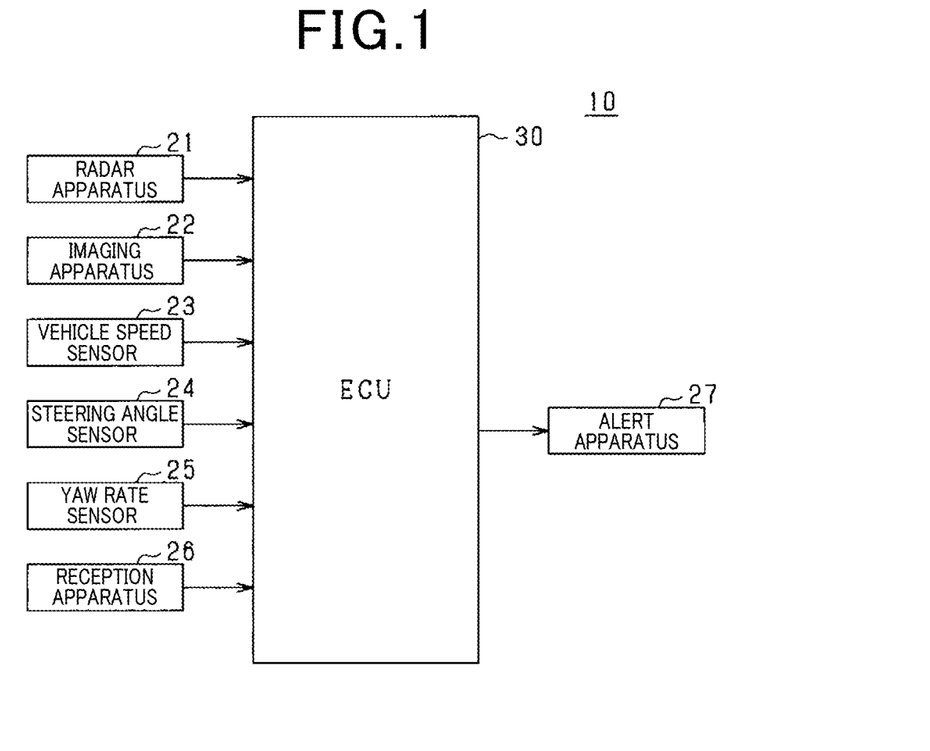
FIG. 1 is a block diagram showing a configuration of a periphery monitoring system.

As shown in FIG. 1, a periphery monitoring system 10 according to the embodiment is provided with a radar apparatus 21, an imaging apparatus 22, a vehicle speed sensor 23, a steering angle sensor 24, a yaw rate sensor 25, a reception apparatus 26, an alert apparatus 27 and an ECU 30. According to the present embodiment, the radar apparatus 21 corresponds to a detection apparatus and the ECU 30 corresponds to periphery monitoring apparatus.

The radar apparatus 21 is, for example, a known millimeter-wave radar apparatus in which high-frequency signal in a millimeter-wave band is transmitted as transmission waves. The radar apparatus 21 is disposed in a rear end part of the own vehicle for example, and detects a location of an object existing in a detection region capable of detecting an object, the detection region being a region within a predetermined detection angle. Specifically, the radar apparatus 21 transmits probe waves at predetermined periods and receives reflection waves with a plurality of antennas. The distance to the object can be calculated using a transmission time of the probe waves and a reception time of the reflection waves. Moreover, a relative speed is calculated using a change in the frequency of the reflection waves reflected at the object due to the Doppler effect. Additionally, an azimuth of an object can be calculated using a phase-difference between reflection waves received by the plurality of antennas. When a location and an azimuth of the object is calculated, a relative location of the object with respect to the own vehicle can be identified. The radar apparatus 21 corresponds to a ranging sensor.

Figure 2:
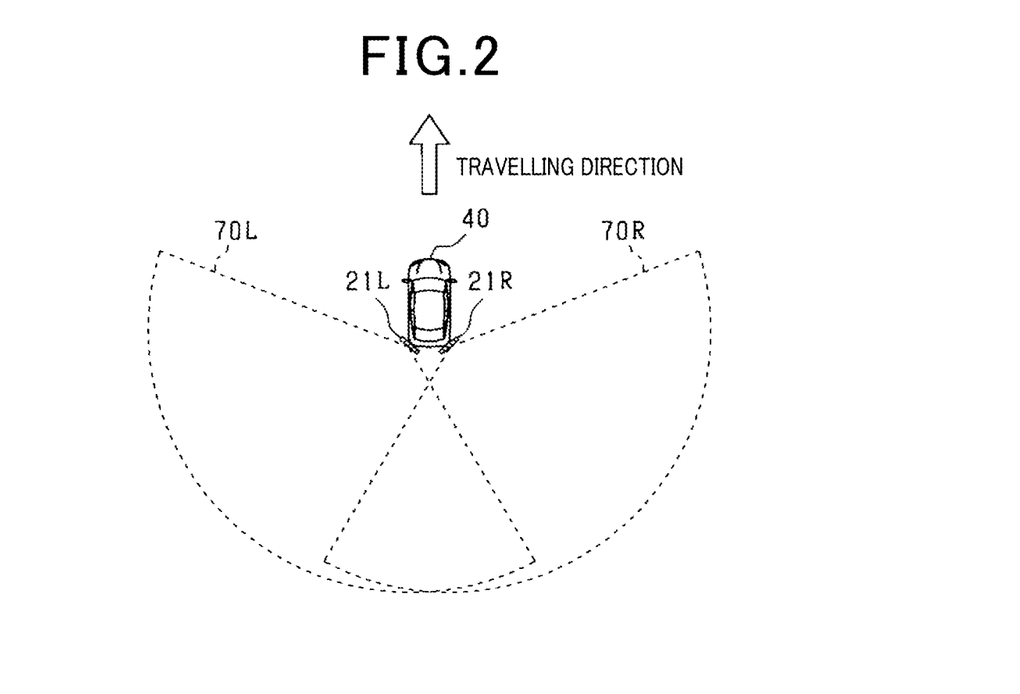
FIG. 2 is a diagram showing a detection region of a periphery of an own vehicle.

As shown in FIG. 2, the radar apparatus 21 is disposed at each of right and left portions in the rear end part of the own vehicle 40, and detects objects in the rear side and laterally rear side of the own vehicle 40. The radar apparatus 21L disposed at a left side of the rear end part of the own vehicle 40 detects an object present in a detection region 70L. The radar apparatus 21R disposed at a right side of the rear end part of the own vehicle 40 detects an object present in a detection region 70R.

The imaging apparatus 22 may be configured as a CCD camera, a CMOS image sensor, or a monocular camera such as near-infrared camera, or a stereo camera. The imaging apparatus 22 may be provided in the own vehicle as a single apparatus or a plurality of apparatuses. The imaging apparatus 22 is attached to the vehicle at a predetermined height position in a center portion of the vehicle with respect to the vehicle-width direction, and captures, as a birds-eye view, an image in a region extending in a predetermined angular region towards a front side or a rear side of the vehicle. The imaging apparatus 22 subsequently outputs images to be subsequently captured, to the ECU 30.

The vehicle speed sensor 23 serves as a sensor that detects a travelling speed of the own vehicle 40 and outputs a travelling speed signal depending on the travelling speed of the own vehicle 40 to the ECU 30. The steering angle sensor 24 detects a steering angle of the steering wheel and outputs a steering angle signal depending on a change in the steering angle to the ECU 30. The yaw rate sensor 25 detects a turning angular speed of the own vehicle 40 and outputs a yaw rate signal depending on the turning angular speed of the own vehicle 40 to the ECU 30.

The reception apparatus 26 is configured to receive a positioning signal from a satellite positioning system, for example, a GPS reception apparatus. The reception apparatus 26 receives a positioning signal depending on the current location of the own vehicle and outputs the received signal to the ECU 30.

The alert apparatus 27 is for outputting a notification to the driver or the like. For the alert apparatus 27, an apparatus that auditorily outputs a notification using a speaker, a buzzer, or the like provided in the vehicle cabin, or an apparatus that visually outputs a notification using a display device or the like, are exemplified. However, the alert apparatus 27 is not limited to these apparatuses. The alert apparatus 27 outputs an alert sound based on a control command from the ECU 30, thereby notifying the driver that a risk of collision with an object is present.

The functions of the ECU 30 can be provided by software recorded in a substantial memory device, a computer that executes the software, only software or hardware or a combination of them. For example, in the case where the ECU 30 is provided by electrical circuits as hardware, the functions can be provided by a digital circuit including many logic circuits, or an analog circuit. For example, the ECU 30 executes programs stored in a non-transitory tangible storage medium as a memory unit included therein. The programs include programs of respective calculation processes which will be described later. The programs are executed, whereby methods corresponding to the programs are executed. The memory unit is, for example, a non-volatile memory. Note that programs stored in the memory unit can be updated through a network such as the internet.

The ECU 30 includes a so-called blind-spot-monitor function. Specifically, the ECU 31 sets a precaution region 71 in a laterally rear side of the own vehicle 40, and when the radar apparatus 21 detects an object in the precaution region 71, the ECU 31 activates a collision avoidance operation that avoids a collision with the object. According to the present embodiment, as the collision avoidance operation, the alert apparatus 27 outputs an alert. The precaution region 71 is set as a region in a laterally rear side of the own vehicle 40, overlapping with a detection region 70 (70L, 70R) of the respective radar apparatuses 21. According to the present embodiment, the precaution region 71 is set to be in a traffic lane adjacent to the own lane where the own vehicle 40 travels. Note that approaching objects include vehicles including a four-wheel vehicle, a motorcycle and a bicycle, and a pedestrian.

Figure 3:
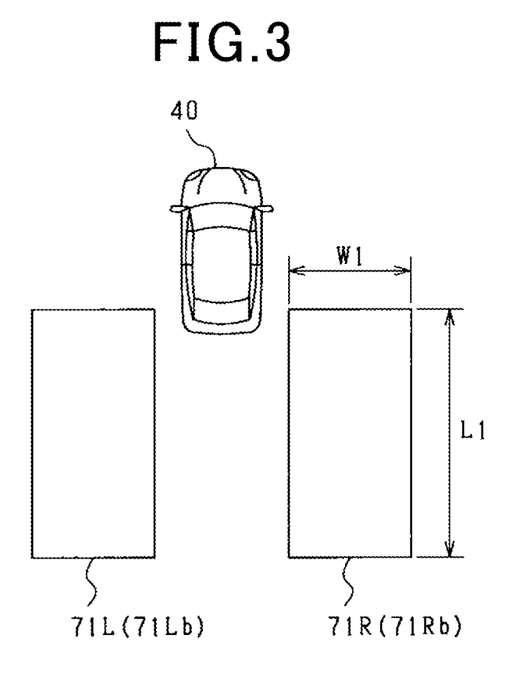
FIG. 3 is a diagram for explaining a setting method of a warning region.

As shown in FIG. 3, the precaution region 71 is set as precaution regions 71L and 71R in a left side and a right side of the vehicle respectively. Each of the precaution regions 71L and 71R is defined as a rectangular region with respect to a location of the own vehicle 40, and provided to be in a region including a part of a rear end part of the own vehicle 30 and a backward area of the own vehicle with respect to the longitudinal direction of the own vehicle 40. The length of each precaution region with respect to the longitudinal direction is defined as L1. The horizontal width with respect to the vehicle width direction is defined as W1. Further, the horizontal width in the vehicle width direction is defined as W1. The left and right precaution regions 71L and 71R have the same shape and size. Each length L1 of the precaution regions 71L and 71R is around 5 to 10 meters, for example. Each horizontal width W1 of the precaution regions 71L and 71R is set to be a fixed width corresponding to a road width of the country. Note that the precaution region 71 may be set to be in a region extending from the rear end part of the own vehicle 40 towards the backward area thereof.

The precaution regions 71L and 71R shown in FIG. 3 are fixed regions having predetermined dimensions. According to the present embodiment, the precaution regions 71L and 71R shown in FIG. 3 are defined as base regions 71Lb and 71Rb.

Figure 4A:
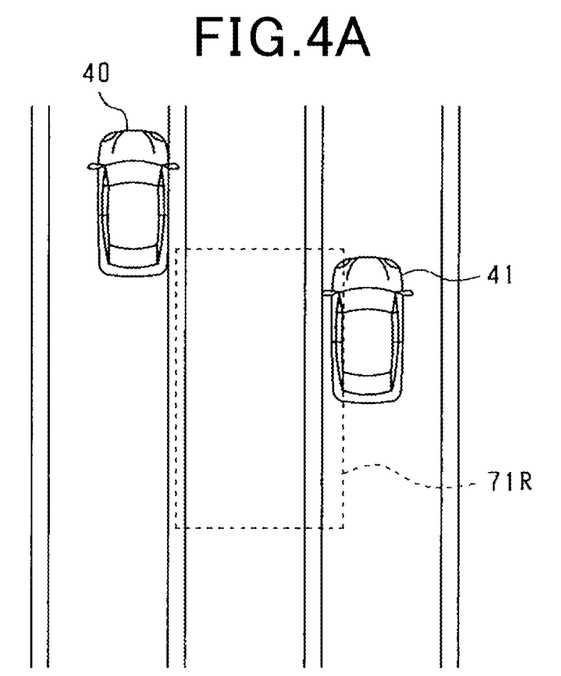
FIG. 4A is a diagram showing examples of a travel scene of the own vehicle.

Here, in the case where the horizontal widths of the precaution regions 71L and 71R are fixed, there is a concern that a collision avoidance operation cannot be appropriately performed for other vehicles travelling in the adjacent lane or other vehicles travelling in the further-adjacent lane as a lane adjacently positioned to the adjacent lane. That is, as shown in FIG. 4A, in the case where horizontal widths of respective traffic lanes are relatively narrower, when the own vehicle travels approaching close to the adjacent lane, the precaution region 71R may protrude to the further-adjacent lane over the adjacent lane. In this case, an unnecessary collision avoidance operation may be activated due to the other vehicle 41 travelling in the further-adjacent lane.

Figure 4B:
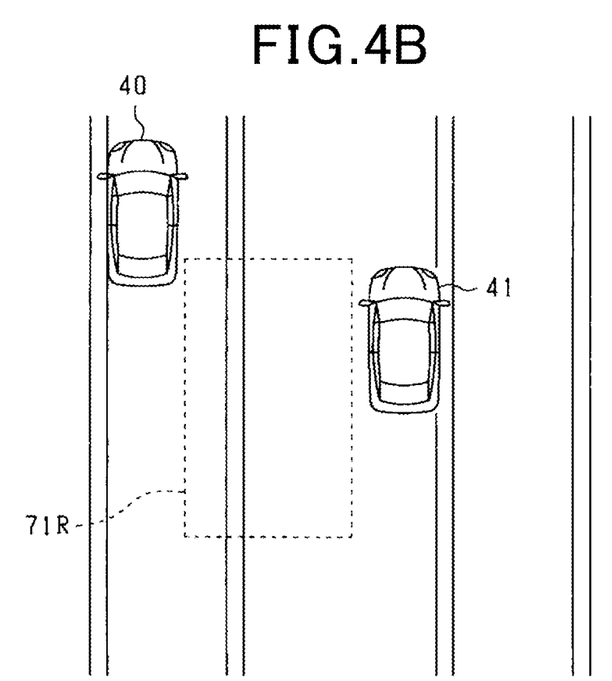
FIG. 4B is a diagram showing examples of a travel scene of the own vehicle.

Further, as shown in FIG. 4B, in the case where the horizontal width of the adjacent lane is wider and other vehicle 41 is traveling on the adjacent lane being away from the own vehicle 40, when the own vehicle 40 traveling on the own lane is shifted towards a position away from the adjacent lane, other vehicle 41 may depart from the precaution region 71R. In this case, a collision avoidance operation due to the other vehicle 41 may not be activated.

In this respect, according to the present embodiment, lane information indicating presence or absence of a lane marking on respective traffic lanes is acquired, a position of the lane marking is recognized based on the lane information, and then the precaution regions 71L and 71R are set based on the position of the lane marking. Specifically, the ECU 30 acquires the lane marking recognized from the image of the imaging apparatus 22 as the lane information, and recognizes locations of the lane markings in the respective traffic lanes based on the lane markings on the image. Then, a region from one lane marking to the other lane marking that define an adjacent lane is recognized as an adjacent-lane region, and the precaution regions 71L and 71R are set to be in the adjacent-lane region. The lane marking is a white line or a yellow line on a road surface.

Further, in addition to the above-described configuration, when the own vehicle 40 makes a lane-change, the own vehicle 40 approaches an object traffic lane to which the own vehicle 40 changes the lane, while receding from a traffic lane opposite to the object traffic lane. Hence, there is a concern that an unnecessary collision avoidance operation may be activated to other vehicle travelling on other traffic lane in the vicinity of the own vehicle. For this reason, according to the present embodiment, in the case where the own vehicle 40 makes a lane change, the precaution regions 71L and 71R are set based on the lane information of the lane marking which is receding from the own vehicle 40 or approaching the own vehicle 40. Hereinafter, processes for setting the precaution region will be described in detail.

Figure 5:
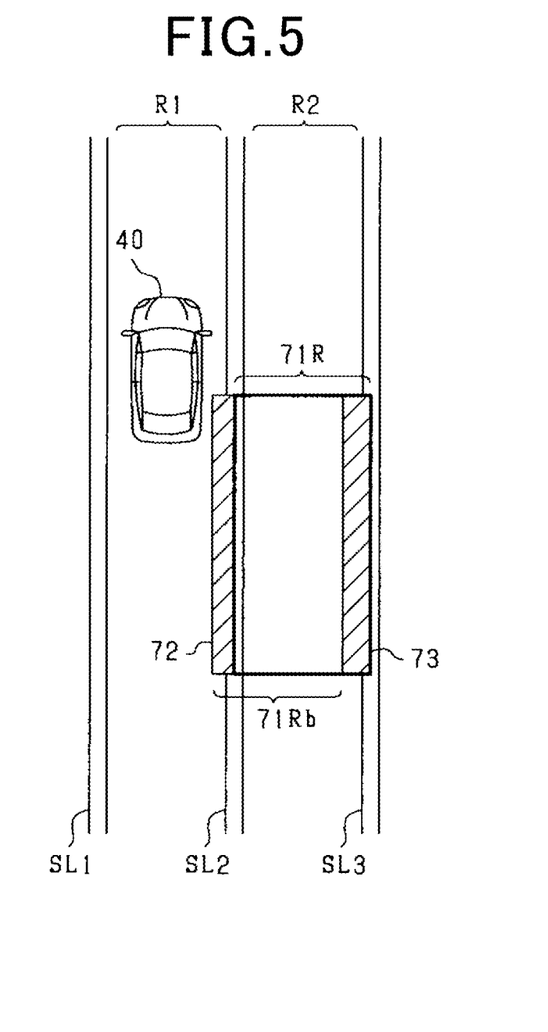
FIG. 5 is a diagram for explaining a setting method of a warning region.

FIG. 5 shows a precaution region 71R when the own vehicle 40 travels straight without changing the lane. FIG. 5 shows an own lane R1, a right-hand side adjacent lane R2 of which the travel direction is the same, lane markings SL1 to SL3 which define the respective traffic lanes R1 and R2. Moreover, the own vehicle 40 travels on the own lane R1 and the precaution region 71R is set to be in an adjacent lane R2 side.

The ECU 20 sets a base region 71Rb of the precaution region 71 in a laterally rear side of the own vehicle 40. The base region 71Rb is set to be a region having predetermined dimensions extending in the longitudinal direction and the vehicle width direction of the own vehicle 40 with respect to the location of the own vehicle 40 (See FIG. 3). In FIG. 5, the base region 71Rb is set to be shifted towards left side relative to the adjacent lane R2.

Further, the ECU 30 recognizes, using the image captured by the imaging apparatus 22, positions of the lane markings SL2 and SL3 in the left and right side of the adjacent lane R2, determines the adjacent lane R2 in accordance with the positions of the lane markings SL2 and SL3, and performs a region-correction based on a determination whether the base region 71Rb is surplus or deficient to the adjacent lane R2, thereby setting the precaution region 71R. In FIG. 5, a region protruded in a left side of the lane marking in the left side of the adjacent lane R2 is defined as a surplus region 72, and a region shifted in the left side of the lane marking SL3 in the right side of the adjacent lane R2 is defined as a deficient region 73, and the region-correction is applied to the base region 71Rb using the surplus region 72 and the deficient region 73, thereby setting the final precaution region 71R. In other words, the base region 71Rb is reduced by the surplus region 72 and increased by the deficient region 73, whereby the final precaution region 71R is set.

The lateral end position of each of the lane markings SL2 and SL3 of the precaution region 71R may be the center of each of the lane markings SL2 and SL3 in the width direction thereof. However, the lateral end positions of the precaution region 71R may be end positions of the respective lane markings SL2 and SL3 in the width direction thereof (end positions in the closest position or the farthest position with respect the own lane R1).

The precaution region 71R is set between the lane marking SL2 and the lane marking SL3 of the adjacent lane R2. Thus, even when the posture (i.e. travel direction) of the own vehicle 40 is inclined relative to a direction where the own lane R1 extends, the precaution region 71R is appropriately set within the adjacent lane R2.

Figure 6:
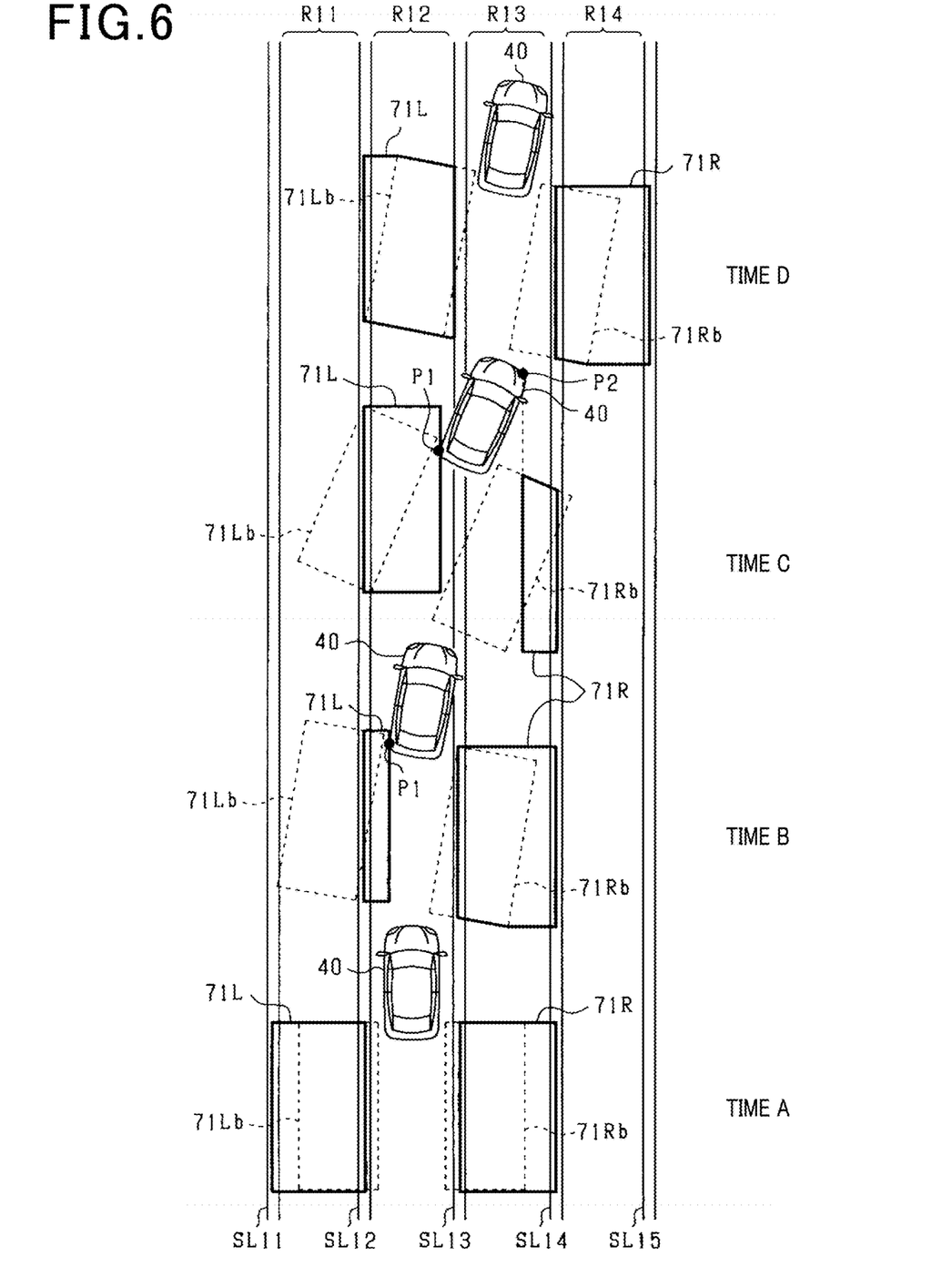
FIG. 6 is a diagram showing for explaining a setting method of a warning region when making a lane change.

Next, with reference to FIG. 6, setting of the precaution regions 71L and 71R when the own vehicle 40 makes a lane change will be described in detail. In FIG. 6, the lane marking SL12 corresponds to a lane marking receding from the own vehicle 40 and the lane markings SL13 and SL14 correspond to a lane marking approaching the own vehicle 40.

FIG. 6 shows precaution regions 71L and 71R in the case where the own vehicle 40 makes a lane change. FIG. 6 shows a first lane R11, a second lane R12, a third lane R13 and a fourth lane R14 of which the travel direction is the same, and lane markings SL11 to SL15 that define respective lanes R11 to R14. Also, FIG. 6 shows a state where respective precaution regions 71L and 71R are sequentially changed from time A, time B, time C and time D in this order when the own vehicle 40 changes the traffic lane from the second lane R12 to the third lane R13.

According to the present embodiment, when the own vehicle 40 makes a lane change, the state is changed from a first state for setting the precaution regions 71L and 71R on the adjacent lanes in both left and right sides to a second state for setting the precaution regions 71L and 71R on two lanes as both sides of the lane marking which the own vehicle crosses due to the lane change. Hereinafter, details thereof will be described as follows.

At time A, the precaution regions 71L and 71R are set for the first lane R11 and the third lane R13 as adjacent lanes at the left and right sides of the second lane R12. In this case, as described with reference to FIG. 5, positions of the respective lane markings SL11 to SL 14 of the lane R11 and the lane R13 are recognized and a region-correction is applied to the base regions 71RL, 71Rb based on the positions of the respective lane markings SL11 to SL14, thereby setting the precaution regions 71L and 71R.

At time B, the own vehicle 40 is in right-turning state. In this state, the precaution regions 71L and 71R are set on the second lane R12 as an own lane before changing the lane and the third lane R13 as a right-adjacent lane. The state at the time A refers to first state, and the state at the time B refers to second state. In this case, the state is temporarily changed from the state at time A to the state at time B based on the lane information of the lane marking SL13 that crosses the own vehicle 40.

In this case, in the second lane R12 (i.e. own lane before changing the lane), a region from the lane marking SL12 positioned in an opposite side of the object traffic lane to which the own vehicle 40 changes lane, to the own vehicle 40 is set to be the precaution region 71L on the second lane R12. More specifically, the precaution region 71L of the second lane R12 is set between the lane marking SL12 and a straight line extending in parallel to the lane marking SL12 from a position P1 as the most rear end side of a side face of the own vehicle 40. The precaution region 71L of the second lane R12 is set based on the lane information of the lane marking SL12 receding from the own vehicle 40.

When supplementarily explaining time A and time B, at the time A, the precaution region 71 is set, with respect to the own lane before changing the lane, to be in an outer side of the lane marking SL12 positioned in an opposite side of the object traffic lane to which the own vehicle 40 changes lane (first state). Also, at time B, the precaution region 71 is set, with respect to the own lane before changing lane, to be in an inner side of the lane marking SL12 positioned in an opposite side of the object traffic lane to which the own vehicle 40 changes lane (second state). In this case, the state is temporarily changed from the state at time A to the state at time B based on the lane marking information of the lane marking SL12 receding from the own vehicle 40.

Further, at time B, in the third lane R13, the precaution region 71R is set between the lane marking SL13 and the lane marking SL14 which are positioned at both sides of the third lane R13.

Note that lengths of respective precaution regions 71L and 71L in the longitudinal direction at time B may be the same as those before changing the lane.

Thereafter, at time C, similar to time B, the precaution regions 71L and 71R are set on the second lane R12 as an own lane before changing the lane and the third lane R13 as a right-adjacent lane. In this case, the own vehicle 40 crosses the lane marking SL13 positioned between the second lane R12 and the third lane R13. That is, the rear end part of the own vehicle 40 enters the second lane R12 before changing the lane and the front end part of the own vehicle 40 enters the third lane R13 as an object lane for the lane change.

Hence, the precaution region 71L of the second lane R12 is set between the lane marking SL12 and a straight line extending in parallel to the lane marking SL12 from a position P1 as the most rear end side of a side face of the own vehicle 40. Further, the precaution region 71R of the third lane R13 is set between the lane marking SL14 and a straight line extending in parallel to the lane marking SL14 from a position P2 as the most front end side of a side face of the own vehicle 40. The precaution region 71R of the third lane R13 is set based on the lane information of the lane marking SL14 approaching the own vehicle 40.

At time B and time C, the longitudinal lengths of the precaution regions 71L and 71R may be differentiated between a region in the object traffic lane for the lane change and an opposite region in a right-side region and a left-side region in front of the own vehicle. Specifically, as shown in FIG. 6, when changing the lane to the right-adjacent lane, the longitudinal length of the left-side precaution region 71L may be set to be shorter than the longitudinal length of the right-side precaution region 71R. In this case, the front end position of the precaution region 71L is not changed and the rear end position is changed to be shifted in the front side, thereby shortening the precaution region 71L.

At an intermediate point when the own vehicle 40 makes a lane change, the precaution regions 71L and 71R are set differently from the precaution region when starting a lane change and the precaution region when completing the lane change. That is, in FIG. 6, the precaution regions 71L and 71R in the second state are set to be different from the precaution regions 71L and 71R when starting or completing the lane change.

Note that time D refers a time when the own vehicle 40 completes the lane change. At time D, the third lane R13 is the own lane and the precaution regions 71L and 71R are set on the second lane R12 and the fourth lane R14 which are adjacent lanes of the third lane R13 in both left and right sides.

Figure 7:
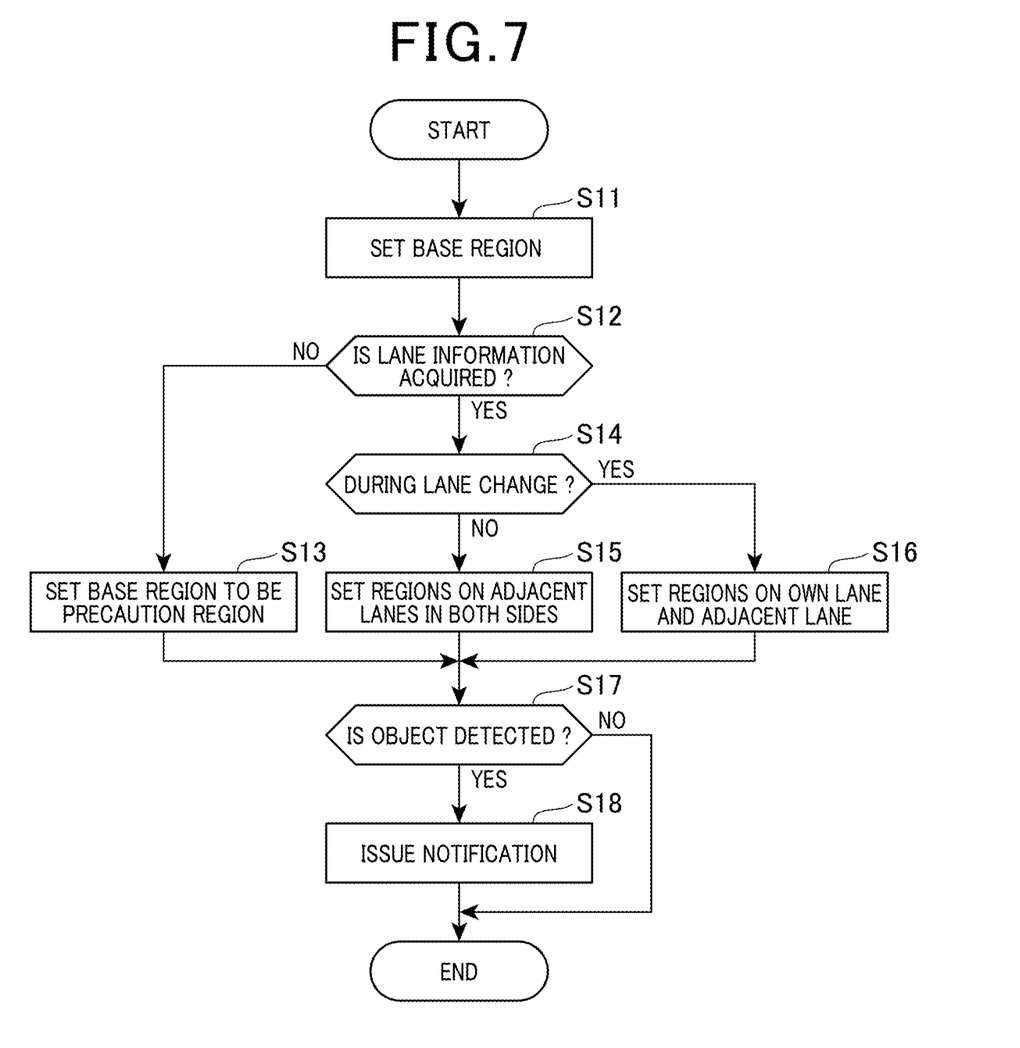
FIG. 7 is a flowchart showing a control process of a collision avoidance operation.

With reference to a flowchart shown in FIG. 7, a control of a collision avoidance operation executed by the ECU 30 will be described. The processes shown in FIG. 7 are repeatedly executed at predetermined time intervals while the own vehicle is being driven.

First, at step S11, the process sets, in the laterally rear side of the own vehicle 40, base regions 71Lb and 71Rb each having a predetermined dimension with respect to position of the own vehicle. At step S12, the process determines whether lane information indicating a presence of the lane marking is acquired. Specifically, for the lane information, an acquiring process is executed for acquiring detection information of the lane marking detected by the imaging apparatus 22, and the process determines whether the detection information is acquired. The process at step S11 corresponds to base region setting unit and the process at step S12 corresponds to acquiring unit.

When the lane information is not acquired, the process proceeds to step S13, and sets the base regions 71Lb and 71Rb to be the precaution regions 71L and 71R. When the lane information is acquired, the process proceeds to step S14.

At step S14, the process determines whether the own vehicle 40 is changing the lane. The determination whether the own vehicle is changing the lane may be performed by a determination whether the own vehicle crosses a lane marking (e.g. lane marking SL13 shown in FIG. 6) to be crossed due to the lane change, that is, whether the own vehicle 40 overlaps the lane marking to be crossed due to the lane change. When describing with reference to FIG. 6, the process may determine that the lane change is started at a time when the front end part of the own vehicle 40 reaches the lane marking SL13, and may determine that the lane change is completed at a time when the rear end part of the own vehicle 40 passes the lane marking SL13.

Further, it is possible to determine whether the own vehicle 40 is changing the lane based on ON-information of the turn signal or a turning state of the own vehicle 40. For example, when determined that the own vehicle 40 is turning based on the output of turn signal being ON and a yaw rate signal, it is possible to determine that the own vehicle 40 is changing the lane.

When the own vehicle 40 is not changing the lane, the process proceeds to step S15, and corrects the base regions 71Lb and 71Rb so as to set the precaution regions 71L and 71R on adjacent lanes positioned in both left and right sides. Thus, for example, as shown with time A and time D in FIG. 6, the precaution regions 71L and 71R are set on the first lane R11 and the third lane R13 positioned in both left and right sides of the second lane R12 (i.e. own lane).

Also, in the case where the own vehicle 40 is changing the lane, the process proceeds to step S15, and corrects the base regions 71Lb and 71Rb so as to set the precaution regions 71L and 71R on two lanes in both sides of the lane marking to be crossed due to the lane change, that is, the own lane and the adjacent lane as an object lane for the lane change. Thus, as shown at time B and time C in FIG. 6, the precaution regions 71L and 71R are set on the second lane R12 as the own lane before changing the lane and the third lane R13 as the right-adjacent lane.

With the respective processes of steps S15 and S16, positions of the lane markings are recognized based on the lane information and the precaution regions 71L and 71R are set based on the recognized positions of the lane marking. The respective processes of steps S15 and S16 correspond to recognition unit and precaution region setting unit.

Note that it is possible to set the precaution regions 71L and 71R without using the base regions 71Lb and 71Rb at steps S15 and S16. Specifically, at step S15, the precaution regions 71L and 71R may be set based on the positions of the lane markings that define the adjacent lanes in both left and right sides, without using the base regions 71Lb and 71Rb. At step S16, the precaution regions 71L and 71R may be set based on the positions of the lane markings that define the two lanes as object lanes for the lane change, without using the base regions 71Lb and 71Rb.

At step S17, the process determines whether an object is detected in the precaution regions 71L and 71R. When an object is detected in the precaution regions 71L and 71R, the process proceeds to step S18, outputs a command for issuing a notification to the alert apparatus 27 and temporarily terminates the process.

In the case where the determination at step S12 is negative, when the own vehicle 40 is changing the lane, the precaution regions 71L and 71R may not be set so as to avoid issuing unnecessary notifications.

According to the above-detailed embodiments, the following effects and advantages can be obtained.

The lane information indicating presence or absence of lane markings in the traffic lane is acquired, and the precaution region 71 is set based on the positions of the lane markings recognized in accordance with the acquired lane information. In this case, as long as the positions of the respective lane markings are recognized on the road where the own vehicle travels, adjacent lanes or the like which are defined by the respective lane markings can be accurately recognized. Thus, unnecessary collision avoidance operations for other vehicles travelling on adjacent-adjacent lane can be prevented from being executed, or necessary collision avoidance operation for other vehicles travelling on the adjacent lane can be prevented from not being executed. As a result, the precaution region 71 can be appropriately set and the collision avoidance operation can be appropriately performed.

The base region having a predetermined dimension with reference to the position of the own vehicle 40 is set to be in a laterally rear side of the own vehicle 40, whereby objects approaching the own vehicle 40 can be appropriately recognized. Further, an adjacent lane adjacent to the own lane where the own vehicle 40 travels is recognized using positions of the lane markings, and a region correction is applied to the adjacent lane using a region depending on whether the base region is surplus or deficient, thereby setting the precaution region 71. Thus, the precaution region 71 can be set within a just sufficient region with respect to the adjacent lane. In this case, even when the own vehicle 40 crosses a direction where the traffic lane extends, the precaution region 71 can be appropriately set to be in the adjacent lane.

In the case where the own vehicle 40 makes a lane change, the state is temporarily changed from the first state in which the precaution region 71 is set, with respect to the own lane before changing the lane, to be in an outer side of a lane marking positioned in an opposite side of the object traffic lane to which the own vehicle 40 changes the lane, to a second state in which the precaution region 71 is set to be in an inner side of the lane marking positioned in the opposite side of the object traffic lane to which the own vehicle 40 changes the lane. In this case, in an opposite region of the object lane for the lane change among a right-side region and a left-side region in front of the own vehicle, the precaution region 71 is changed to be in the own lane from the adjacent lane. Thus, the precaution region 71 can be set at an appropriate position depending on the situation with a required minimum size, and collision avoidance operation can be appropriately performed.

In the case where the own vehicle 40 is travelling on a road having adjacent lanes at both left and right sides of the own lane, and makes a lane change, the state is temporarily changed from a first state in which the precaution regions 71L and 71R are set on the adjacent lanes at the left and right sides to a second state in which the precaution regions 71L and 71R are set on the two lanes at both sides of the lane marking which the own vehicle crosses due to the lane change. Thus, the precaution regions 71L and 71R at both sides can be set at an appropriate position depending on a situation with a required minimum size, and a collision avoidance operation can be appropriately performed.

In the case where the own vehicle 40 makes a lane change, the precaution regions 71L and 71R are set based on the lane information of the lane marking which is receding from the own vehicle 40 or approaching the own vehicle 40. Thus, when the own vehicle 40 is changing the lane, unnecessary collision avoidance operation for other vehicles travelling on other lane in the vicinity of the own vehicle can be prevented from being executed. As a result, the precaution region 71 can be appropriately set and the collision avoidance operation can be appropriately executed.

The precaution regions 71L and 71R during a lane change of the own vehicle 40 are set in a manner different from that of setting a precaution region when starting a lane change and a precaution region when completing the lane change. Thus, the precaution regions 71L and 71R can be set depending on a situation during the lane change of the own vehicle 40.

When the own vehicle 40 makes a lane change, a region from a lane marking positioned in an opposite side of the object traffic lane for the lane change to the own vehicle 40 is set to be the precaution region 71 in a traffic lane before changing the lane. Further, in the object traffic lane for the lane change, a region from a lane marking positioned outside the object traffic lane to the own vehicle 40 is set to be a precaution region 71 in the object traffic lane for the lane change. In this case, when the own vehicle 40 crosses the lane marking for the lane change, the precaution regions 71L and 71R are set at positions close to the own vehicle 40 as much as possible on the lane before changing the lane and the object lane after the changing the lane. Thus, a collision avoidance operation can be appropriately executed for other vehicles passing through a position close to the own vehicle 40 when the own vehicle 40 changes the lane.

Other Embodiments

The above-described embodiments may be modified in the following manners.

A size of the precaution region 71 may be changed depending on whether the lane marking that defines the traffic lane is a yellow marking that restricts a vehicle from deviating from the traffic lane or a white marking that does not restrict a vehicle from protruding from the traffic lane. Here, the ECU 30 acquires, as lane information, a plurality of detection points Pd detected by the imaging apparatus 22 at the lane markings on the road surface, and recognizes positions of the lane markings based on the detected plurality of detection points Pd. In this case, outline of the lane markings is detected as a plurality of detection points Pd from the image acquired by the imaging apparatus 22, and the positions of the lane markings are recognized based on the plurality of the detection points Pd.

Then, the ECU 30 determines whether the lane marking SL 22 of the adjacent lane R22 is a yellow marking or a white marking. When the lane marking SL22 is a white marking, the ECU 30 adds a region corresponding to an amount of variation of a plurality of detection points and sets the precaution region 71. Further, when the lane marking SL22 is a yellow marking, the precaution region is set without adding a region corresponding to an amount of variation of the plurality of detection points. Note that yellow marking corresponds to regulated lane and white marking corresponds to non-regulated lane.

Figure 8A:
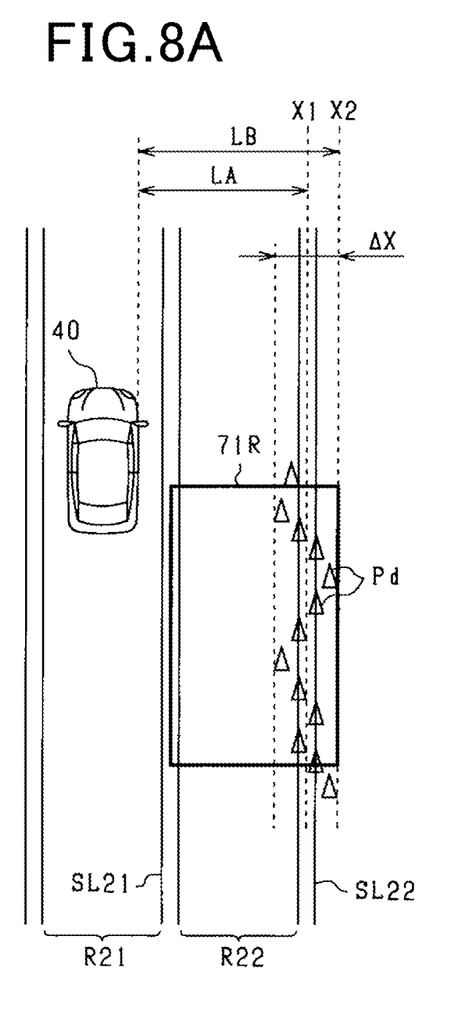
FIG. 8A is a diagram for explaining a setting method of a warning region according to another example.
Figure 8B:
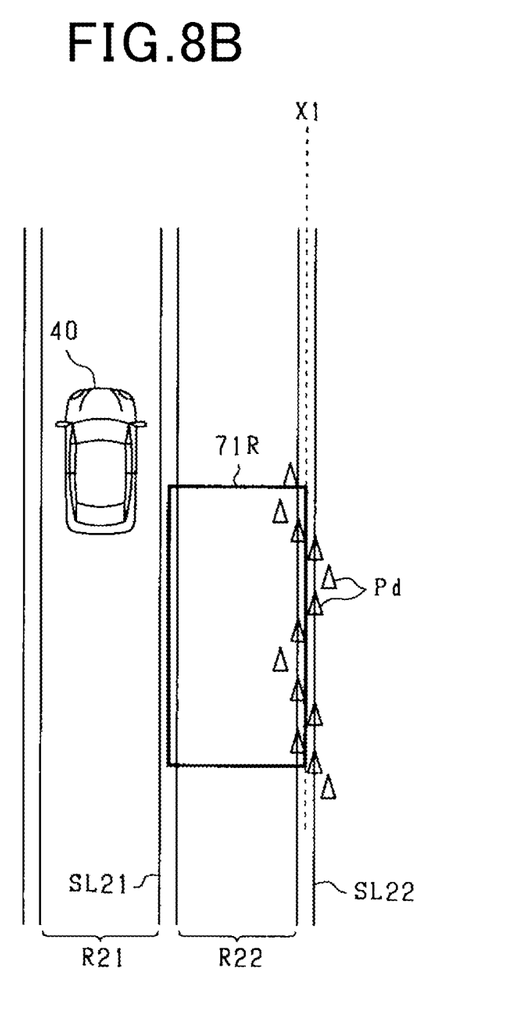
FIG. 8B is a diagram for explaining a setting method of a warning region according to another example.

With reference to FIG. 8A and FIG. 8B, recognition of positions of lane markings, and setting of the precaution region 71 in accordance with the positions of the lane markings will be described. FIG. 8A and FIG. 8B show the own lane R21 and an adjacent lane R22, and lane markings SL21 and SL22 positioned in the left and right sides of the adjacent lane R22. Also, a plurality of detection points Pd are shown for a lane marking SL22 positioned at right side of the adjacent lane R22. FIG. 8A shows a method for setting the precaution region 71 when the lane marking SL22 is a white marking, and FIG. 8B shows a method for setting the precaution region 71 when the lane marking SL22 is a yellow marking.

In the case where the lane marking SL22 is a white marking, in FIG. 8A, a position X1 of the lane marking SL22 is recognized based on a plurality of detection points Pd. In this case, the position X1 is recognized in accordance with an average value of distances from the own vehicle 40 to respective detection points Pd. The position X1 is defined by a distance LX from the own vehicle 40 to a position X1. Further, a variation amount ΔX indicating a degree of variation at the plurality of detection points Pd is calculated, and ½ of the variation amount ΔX is added to the distance LX at the position X1, thereby calculating a correction position X2. Then, the precaution region 71 is set to be in a region extended in a vehicle width direction by an amount of variation (ΔX/2) of the detection of the lane marking.

On the other hand, when the lane marking in the adjacent lane is yellow marking, in FIG. 8B, the precaution region 71 is set based on the position X1 without extending an amount of variation (ΔX/2) of the lane marking.

When setting the precaution region 71 considering a variation of the detection points Pd of the lane markings, an unnecessary collision avoidance operation may be activated. Further, when the lane marking is a yellow marking, which is different from a case of the white marking, another vehicle is unlikely to change lane crossing the lane marking. Taking this into consideration, if the lane marking is a yellow marking, the precaution region 71 is set to be narrower than that of a white lane. Therefore, the precaution region 71 can be accurately set depending on whether the lane marking is a white marking or a yellow marking.

According to the above-described embodiments, it is configured that the positions of the lane markings are recognized using detection information of the lane markings detected by the imaging apparatus 22 as the lane information. However, information other than the detection information of the imaging apparatus 22 may be utilized as the lane information. For example, as long as a LiDAR apparatus using laser waves as the transmission waves is mounted to the own vehicle 40, a configuration may be utilized in which the LiDAR apparatus detects detection information of the lane markings as the lane information. Alternatively, as the lane information, current positional information using GPS or the like and road information included in the map are acquired, and the positions of the lane markings may be recognized using the acquired road information. In this case, information of a lane width of each traffic lane may be included in the road information.

Figure 9:
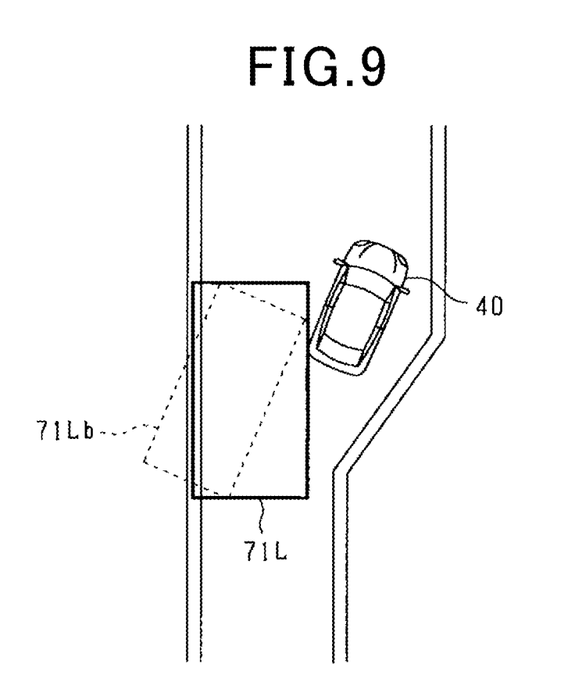
FIG. 9 is a diagram for explaining a setting method of a warning region according to another example.

The precaution regions 71L and 71R may be set depending on the road situation of the road where the own vehicle 40 travels. Specifically, as shown in FIG. 9, in the case where the lateral width of the own lane is being expanded, and the own vehicle 40 is positioned unevenly at one side in the left and right sides in the own lane, the precaution region 71 may be set to be in the own lane. In this case, the ECU 30 sets the precaution region 71 to be in the own lane based on the positions of the lane markings, when the lateral width of the own lane is expanded and the own vehicle 40 is positioned unevenly at one side in the left and right sides in the own lane. For example, in the case where the own vehicle travels on a ramp road in the vicinity of an exit of an express way, the precaution region 71 is set as shown in FIG. 9.

It is possible to set the precaution region 71 at one side of the left and right sides of the own vehicle 40. For example, when the own vehicle 40 travels on a road having two lanes on each side, the precaution region 71 may be set on an adjacent lane of the own lane as a different side of the own lane in the two lanes.

As a collision avoidance operation, a configuration is utilized in which the alert apparatus 27 outputs an alert, but this configuration may be modified. For example, as the collision avoidance operation, any one of operations among a door lock of a door-lock device, a braking of the own vehicle by the brake apparatus and a steering operation of the own vehicle by the steering apparatus may be used.

According to the above-described embodiments, the ECU 30 is configured to accomplish the functions for performing a process related to an imaging and a process related to a lane marking recognition, but this configuration may be modified. For example, dedicated processing unit may be provided corresponding to each of functions for performing a process related to an imaging and a process related to a lane marking recognition, and these processing units may be combined to constitute the ECU 30.

The vehicle control apparatus and method thereof disclosed in the present disclosure may be accomplished by a dedicated computer constituted of a processor and a memory programmed to execute one or more functions embodied by computer programs. Alternatively, the vehicle control apparatus and method thereof disclosed in the present disclosure may be accomplished by a dedicated computer provided by a processor configured of one or more dedicated hardware logic circuits. Further, the vehicle control apparatus and method thereof disclosed in the present disclosure may be accomplished by one or more dedicated computers where a processor and a memory programmed to execute one or more functions, and a processor configured of one or more hardware logic circuits are combined. Furthermore, the computer programs may be stored, as instruction codes executed by the computer, into a computer readable non-transitory tangible recording media.

While the present disclosure has been described in accordance with the examples, the present disclosure should be understood such that the present disclosure is not limited to the examples and structures. The present disclosure also includes various modifications and modifications within an equivalent region. Additionally, various combinations and forms, as well as other combinations and forms further including only one element, more, or less, also fall within the category and scope of the present disclosure.

Hereinafter, significant features extracted from the above-described respective embodiments will be described.

[Configuration 1]

A periphery monitoring apparatus (30) applied for a vehicle provided with a ranging sensor (21) that transmits probe waves and receives reflection waves of the probe waves, the periphery monitoring apparatus sets a precaution region in a laterally rear side of an own vehicle (40) and causes a collision avoidance operation to be executed when the ranging sensor detects an object in the precaution region, the periphery monitoring apparatus comprising:
- an acquiring unit that acquires lane information indicating presence or absence of a lane marking on a traffic lane;
- a recognition unit that recognizes a position of the lane marking based on the lane information; and
- a precaution region setting unit that sets the precaution region based on the position of the lane marking recognized by the recognition unit.

[Configuration 2]

The periphery monitoring apparatus according to configuration 1,
wherein
- the periphery monitoring apparatus further comprises a base region setting unit that sets, in a laterally rear side of the own vehicle, a base region having a predetermined dimension extending in a longitudinal direction and a vehicle width direction of the own vehicle with respect to a position of the own vehicle; and
- the precaution region setting unit recognizes, based on the position of the lane marking recognized by the recognition unit, an adjacent lane adjacent to an own lane where the own vehicle travels, and applies a region correction to the recognized adjacent lane using a region depending on whether the base region is surplus or deficient, thereby setting the precaution region.

[Configuration 3]

The periphery monitoring apparatus according to configuration 1 or 2,
wherein
- the precaution region setting unit temporarily changes a state from a first state to a second state when the own vehicle makes a lane change;
- the first state being a state where the precaution region is set, with respect to an own lane where the own vehicle travels before changing the lane, to be in an outer side of a lane marking positioned in an opposite side of an object traffic lane to which the own vehicle changes the lane; and
- the second state being a state where the precaution region is set, with respect to an own lane where the own vehicle travels before changing the lane, to be in an inner side of the lane marking positioned in the opposite side of the object traffic lane to which the own vehicle changes the lane.

[Configuration 4]

The periphery monitoring apparatus according to configuration 1 or 2,
wherein
- in the case where the own vehicle makes a lane change on a road having adjacent lanes at both left and right sides of an own lane where the own vehicle travels,
- the precaution region setting unit temporarily changes a state from a first state in which the precaution regions are set on the adjacent lanes at the left and right sides, to a second state in which the precaution regions are set on two lanes at both sides of a lane marking which the own vehicle crosses due to the lane change.

[Configuration 5]

The periphery monitoring apparatus according to configuration 4,
wherein
- in the case where the own vehicle makes a lane change, the precaution region setting unit sets, in the own lane before the lane change, a region from a lane marking positioned in an opposite side of an object traffic lane for the lane change to the own vehicle, to be the precaution region in the own lane before the lane change, and the precaution region setting unit sets, in the object traffic lane for the lane change, a region from a lane marking positioned outside the object traffic lane to the own vehicle, to be a precaution region in the object traffic lane.

[Configuration 6]

The periphery monitoring apparatus according to any one of configurations 1 to 5,
wherein
- the acquiring unit acquires, as the lane information, a plurality of detection points detected by a detection apparatus (22) at a lane marking on a road surface;
- the recognition unit recognizes a position of the lane marking based on the plurality of detection points;
- the precaution region setting unit determines whether a lane marking of an adjacent lane adjacently positioned to an own lane where the own vehicle travels is a regulated lane that regulates a vehicle protruding from a traffic lane or a non-regulated lane that does not regulate a vehicle protruding from a traffic lane;
- the precaution region setting unit, when determined that the lane marking of the adjacent lane is the regulated lane, sets the precaution region to which a region corresponding to an amount of variation of the plurality of detection points is added; and
- the precaution region setting unit, when determined that the lane marking of the adjacent lane is the non-regulated lane, sets the precaution region without adding a region corresponding to an amount of variation of the plurality of detection points.

[Configuration 7]

A periphery monitoring apparatus (30) applied for a vehicle provided with a ranging sensor (21) that transmits probe waves and receives reflection waves of the probe waves, the periphery monitoring apparatus sets a precaution region in a laterally rear side of an own vehicle (40) and causes a collision avoidance operation to be executed when the ranging sensor detects an object in the precaution region, the periphery monitoring apparatus comprising:
- an acquiring unit that acquires lane information indicating presence or absence of a lane marking on a traffic lane; and
- a precaution region setting unit that sets the precaution region based on the lane information of the lane marking which is receding from the own vehicle or approaching the own vehicle in the case where the own vehicle makes a lane change.

[Configuration 8]

The periphery monitoring apparatus according to configuration 7,
wherein
- the precaution region setting unit sets the precaution region during a lane change of the own vehicle in a manner different from that of setting a precaution region when starting a lane change and a precaution region when completing the lane change.

[Configuration 9]

The periphery monitoring apparatus according to configuration 7 or 8,
wherein
- the precaution region setting unit temporarily changes a state from a first state to a second state, based on the lane information of the lane marking which is receding from the own vehicle when the own vehicle makes a lane change;

the first state being a state where the precaution region is set, with respect to an own lane where the own vehicle travels before changing the lane, to be in an outer side of a lane marking positioned in an opposite side of an object traffic lane to which the own vehicle changes the lane; and the second state being a state where the precaution region is set, with respect to an own lane where the own vehicle travels before changing the lane, to be in an inner side of the lane marking positioned in the opposite side of the object traffic lane to which the own vehicle changes the lane.

[Configuration 10]

The periphery monitoring apparatus according to configuration 7 or 8, wherein in the case where the own vehicle makes a lane change on a road having adjacent lanes at both left and right sides of an own lane where the own vehicle travels, the precaution region setting unit temporarily changes, based on the lane information of the lane marking which is approaching the own vehicle, a state from a first state in which the precaution regions are set on the adjacent lanes at the left and right sides, to a second state in which the precaution regions are set on two lanes at both sides of a lane marking which the own vehicle crosses due to the lane change.

[Configuration 11]

The periphery monitoring apparatus according to configuration 10, wherein in the case where the own vehicle makes a lane change, the precaution region setting unit sets, in the own lane before the lane change, a region from a lane marking positioned in an opposite side of an object traffic lane for the lane change to the own vehicle, to be the precaution region in the own lane before the lane change, based on the lane information of the lane marking which is receding from the own vehicle; and the precaution region setting unit sets, in the object traffic lane for the lane change, a region from a lane marking positioned outside the object traffic lane to the own vehicle, to be a precaution region in the object traffic lane, based on the lane information of the lane marking which is approaching the own vehicle.

CONCLUSION

The present disclosure provides a periphery monitoring apparatus and a program thereof capable of appropriately setting a warning region and appropriately performing a collision avoidance operation.

A first periphery monitoring apparatus is applied for a vehicle provided with a ranging sensor that transmits probe waves and receives reflection waves of the probe waves, setting a precaution region in a laterally rear side of an own vehicle and causing a collision avoidance operation to be executed when the ranging sensor detects an object in the precaution region. The first periphery monitoring apparatus includes: an acquiring unit that acquires lane information indicating presence or absence of a lane marking on a traffic lane; a recognition unit that recognizes a position of the lane marking based on the lane information; and a precaution region setting unit that sets the precaution region based on the position of the lane marking recognized by the recognition unit.

According to a periphery monitoring apparatus that causes, based on a detection result of an object detected by the ranging sensor, a collision avoidance operation to be executed in the precaution region in the laterally rear side of the own vehicle, when the precaution region is not correctly set, the collision avoidance operation may be inappropriately executed. In this respect, lane information indicating a presence or absence of lane markings on a traffic lane is acquired and the precaution region is set based on the acquired lane information. In this case, as long as positions of respective lane markings recognized on the road where the own vehicle travels, adjacent lanes or the like which are defined by the lane markings are correctly recognized. Thus, an unnecessary collision avoidance operation to other vehicles travelling in the further-adjacent lane, or inactivation of the collision avoidance operation to other vehicles travelling on the further adjacent lane can be avoided. As a result, the precaution region can be appropriately set and the collision avoidance operation can be appropriately executed.

A second periphery monitoring apparatus applied for a vehicle provided with a ranging sensor that transmits probe waves and receives reflection waves of the probe waves, the periphery monitoring apparatus sets a precaution region in a laterally rear side of an own vehicle and causes a collision avoidance operation to be executed when the ranging sensor detects an object in the precaution region. The second periphery monitoring apparatus includes: an acquiring unit that acquires lane information indicating presence or absence of a lane marking on a traffic lane; and a precaution region setting unit that sets the precaution region based on the lane information of the lane marking which is receding from the own vehicle or approaching the own vehicle in the case where the own vehicle makes a lane change.

The precaution region is set when the own vehicle makes a lane change based on the lane information of the lane markings which is receding from the own vehicle or approaching the own vehicle. Thus, when the own vehicle is changing lane, unnecessary collision avoidance operation for other vehicles travelling on another lane in the vicinity of the own vehicle can be prevented from being executed. As a result, the precaution region can be appropriately set and the collision avoidance operation can be appropriately executed.

What is claimed is:

1. A periphery monitoring apparatus applied for a vehicle provided with a ranging sensor that transmits probe waves and receives reflection waves of the probe waves, the periphery monitoring apparatus setting a precaution region in a laterally rear side of an own vehicle and causing a collision avoidance operation to be executed when the ranging sensor detects an object in the precaution region, the periphery monitoring apparatus comprising:

an acquiring unit that acquires lane information indicating presence or absence of a lane marking on a traffic lane;

a recognition unit that recognizes a position of the lane marking based on the lane information; and a precaution region setting unit that sets the precaution region based on the position of the lane marking recognized by the recognition unit, wherein the precaution region setting unit temporarily changes a state from a first state to a second state when the own vehicle makes a lane change;

the first state being a state where the precaution region is set, with respect to an own lane where the own vehicle travels before changing lane, to be in an outer side of a lane marking positioned in an opposite side of an object traffic lane to which the own vehicle changes lane; and the second state being a state where the precaution region is set, with respect to an own lane where the own vehicle travels before changing lane, to be in an inner side of the lane marking positioned in the opposite side of the object traffic lane to which the own vehicle changes lane.

2. The periphery monitoring apparatus according to claim 1,
wherein
the periphery monitoring apparatus further comprises a base region setting unit that sets, in a laterally rear side of the own vehicle, a base region having a predetermined dimension extending in a longitudinal direction and a vehicle width direction of the own vehicle with respect to a position of the own vehicle; and
the precaution region setting unit recognizes, based on the position of the lane marking recognized by the recognition unit, an adjacent lane adjacent to an own lane where the own vehicle travels, and applies a region correction to the recognized adjacent lane using a region depending on whether the base region is surplus or deficient, thereby setting the precaution region.

3. A periphery monitoring apparatus applied for a vehicle provided with a ranging sensor that transmits probe waves and receives reflection waves of the probe waves, the periphery monitoring apparatus setting a precaution region in a laterally rear side of an own vehicle and causing a collision avoidance operation to be executed when the ranging sensor detects an object in the precaution region, the periphery monitoring apparatus comprising:
an acquiring unit that acquires lane information indicating presence or absence of a lane marking on a traffic lane;
a recognition unit that recognizes a position of the lane marking based on the lane information; and
a precaution region setting unit that sets the precaution region based on the position of the lane marking recognized by the recognition unit,
wherein
in the case where the own vehicle makes a lane change on a road having adjacent lanes at both left and right sides of an own lane where the own vehicle travels,
the precaution region setting unit temporarily changes a state from a first state in which the precaution regions are set on the adjacent lanes at the left and right sides, to a second state in which the precaution regions are set on two lanes at both sides of a lane marking which the own vehicle crosses due to the lane change.

4. The periphery monitoring apparatus according to claim 3,
wherein
in the case where the own vehicle makes a lane change, the precaution region setting unit sets, in the own lane before the lane change, a region from a lane marking positioned in an opposite side of an object traffic lane for the lane change to the own vehicle, to be the precaution region in the own lane before the lane change, and the precaution region setting unit sets, in the object traffic lane for the lane change, a region from a lane marking positioned outside the object traffic lane to the own vehicle, to be a precaution region in the object traffic lane.

5. A periphery monitoring apparatus applied for a vehicle provided with a ranging sensor that transmits probe waves and receives reflection waves of the probe waves, the periphery monitoring apparatus setting a precaution region in a laterally rear side of an own vehicle and causing a collision avoidance operation to be executed when the ranging sensor detects an object in the precaution region, the periphery monitoring apparatus comprising:
an acquiring unit that acquires lane information indicating presence or absence of a lane marking on a traffic lane;
a recognition unit that recognizes a position of the lane marking based on the lane information; and
a precaution region setting unit that sets the precaution region based on the position of the lane marking recognized by the recognition unit,
wherein
the acquiring unit acquires, as the lane information, a plurality of detection points detected by a detection apparatus at a lane marking on a road surface;
the recognition unit recognizes a position of the lane marking based on the plurality of detection points;
the precaution region setting unit determines whether a lane marking of an adjacent lane adjacently positioned to an own lane where the own vehicle travels is a regulated lane that regulates a vehicle deviating from a traffic lane or a non-regulated lane that does not regulate a vehicle deviating from a traffic lane;
the precaution region setting unit, when determined that the lane marking of the adjacent lane is the regulated lane, sets the precaution region to which a region corresponding to an amount of variation of the plurality of detection points is added; and
the precaution region setting unit, when determined that the lane marking of the adjacent lane is the non-regulated lane, sets the precaution region without adding a region corresponding to an amount of variation of the plurality of detection points.

6. A non-transitory computer readable media storing a program executed by a control apparatus applied for a vehicle provided with a ranging sensor that transmits probe waves and receives reflection waves of the probe waves,
the program causes the control apparatus to set a precaution region in a laterally rear side of an own vehicle and to execute a collision avoidance operation when the ranging sensor detects an object in the precaution region,
wherein
the program causes the control apparatus to execute:
an acquiring process that acquires lane information indicating presence or absence of a lane marking on a traffic lane;
a recognition process that recognizes a position of the lane marking based on the lane information; and
a precaution region setting process that sets the precaution region based on the position of the lane marking recognized by the recognition process,
wherein
the precaution region setting process temporarily changes a state from a first state to a second state when the own vehicle makes a lane change;
the first state being a state where the precaution region is set, with respect to an own lane where the own vehicle travels before changing lane, to be in an outer side of a lane marking positioned in an opposite side of an object traffic lane to which the own vehicle changes lane; and the second state being a state where the precaution region is set, with respect to an own lane where the own vehicle travels before changing lane, to be in an inner side of the lane marking positioned in the opposite side of the object traffic lane to which the own vehicle changes lane.

7. A non-transitory computer readable media storing a program executed by a control apparatus applied for a vehicle provided with a ranging sensor that transmits probe waves and receives reflection waves of the probe waves,
the program causes the control apparatus to set a precaution region in a laterally rear side of an own vehicle and to execute a collision avoidance operation when the ranging sensor detects an object in the precaution region,
wherein
the program causes the control apparatus to execute:
an acquiring process that acquires lane information indicating presence or absence of a lane marking on a traffic lane;
a recognition process that recognizes a position of the lane marking based on the lane information; and
a precaution region setting process that sets the precaution region based on the position of the lane marking recognized by the recognition process,
wherein
in the case where the own vehicle makes a lane change on a road having adjacent lanes at both left and right sides of an own lane where the own vehicle travels,
the precaution region setting process temporarily changes a state from a first state in which the precaution regions are set on the adjacent lanes at the left and right sides, to a second state in which the precaution regions are set on two lanes at both sides of a lane marking which the own vehicle crosses due to the lane change.

8. A non-transitory computer readable media storing a program executed by a control apparatus applied for a vehicle provided with a ranging sensor that transmits probe waves and receives reflection waves of the probe waves,
the program causes the control apparatus to set a precaution region in a laterally rear side of an own vehicle and to execute a collision avoidance operation when the ranging sensor detects an object in the precaution region,
wherein
the program causes the control apparatus to execute:
an acquiring process that acquires lane information indicating presence or absence of a lane marking on a traffic lane;
a recognition process that recognizes a position of the lane marking based on the lane information; and
a precaution region setting process that sets the precaution region based on the position of the lane marking recognized by the recognition process,
wherein
the acquiring process acquires, as the lane information, a plurality of detection points detected by a detection apparatus at a lane marking on a road surface;
the recognition process recognizes a position of the lane marking based on the plurality of detection points;
the precaution region setting process determines whether a lane marking of an adjacent lane adjacently positioned to an own lane where the own vehicle travels is a regulated lane that regulates a vehicle deviating from a traffic lane or a non-regulated lane that does not regulate a vehicle deviating from a traffic lane;
the precaution region setting process, when determined that the lane marking of the adjacent lane is the regulated lane, sets the precaution region to which a region corresponding to an amount of variation of the plurality of detection points is added; and
the precaution region setting process, when determined that the lane marking of the adjacent lane is the non-regulated lane, sets the precaution region without adding a region corresponding to an amount of variation of the plurality of detection points.

9. A periphery monitoring apparatus applied for a vehicle provided with a ranging sensor that transmits probe waves and receives reflection waves of the probe waves, the periphery monitoring apparatus sets a precaution region in a laterally rear side of an own vehicle and causes a collision avoidance operation to be executed when the ranging sensor detects an object in the precaution region, the periphery monitoring apparatus comprising:
an acquiring unit that acquires lane information indicating presence or absence of a lane marking on a traffic lane; and
a precaution region setting unit that sets the precaution region based on the lane information of the lane marking which is receding from the own vehicle or approaching the own vehicle in the case where the own vehicle makes a lane change,
wherein
the precaution region setting unit sets a region from a lane marking receding from the own vehicle among lane markings positioned at left and right sides of an own lane where the own vehicle travels before the lane change, to the own vehicle to be the precaution region during the lane change.

10. A non-transitory computer readable media storing a program executed by a control apparatus applied for a vehicle provided with a ranging sensor that transmits probe waves and receives reflection waves of the probe waves,
the program causes the control apparatus to set a precaution region in a laterally rear side of an own vehicle and to execute a collision avoidance operation when the ranging sensor detects an object in the precaution region,
wherein
the program causes the control apparatus to execute:
an acquiring process that acquires lane information indicating presence or absence of a lane marking on a traffic lane; and
a precaution region setting process that sets the precaution region based on the lane information of the lane marking which is receding from the own vehicle or approaching the own vehicle in the case where the own vehicle makes a lane change,
wherein
the precaution region setting process sets a region from a lane marking receding from the own vehicle among lane markings positioned at left and right sides of an own lane where the own vehicle travels before the lane change, to the own vehicle to be the precaution region during the lane change.

* * * * *